United States Patent
Lee et al.

(10) Patent No.: US 8,117,348 B2
(45) Date of Patent: Feb. 14, 2012

(54) USER INTERFACE APPARATUS, DIGITAL APPARATUS CONNECTED TO THE SAME, DATA TRANSMITTING SYSTEM INCLUDING THE USER INTERFACE, AND USER INTERFACE METHOD

(75) Inventors: Hee-jung Lee, Suwon-si (KR); Wook Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 12/548,590

(22) Filed: Aug. 27, 2009

(65) Prior Publication Data

US 2010/0057942 A1    Mar. 4, 2010

(30) Foreign Application Priority Data

Aug. 29, 2008  (KR) .................. 10-2008-0085524

(51) Int. Cl.
*G06F 3/00* (2006.01)
*G06F 13/12* (2006.01)

(52) U.S. Cl. ............................... 710/5; 710/15; 710/62

(58) Field of Classification Search ................ 710/5, 15, 710/62
See application file for complete search history.

(56) References Cited

U.S. PATENT DOCUMENTS

| 6,913,477 B2* | 7/2005 | Dayan et al. .................. 439/188 |
| 2005/0052156 A1* | 3/2005 | Liebenow .................... 320/128 |

FOREIGN PATENT DOCUMENTS

KR   1020070105430 A   10/2007

* cited by examiner

*Primary Examiner* — Chun-Kuan Lee
*Assistant Examiner* — David Martinez
(74) *Attorney, Agent, or Firm* — Drinker Biddle & Reath LLP

(57) ABSTRACT

Provided is a user interface apparatus including a plurality of regions and method for operating the same. The user interface apparatus may be configured to respond to a digital apparatus being disposed in a region, by sending information associated with the region. The information indicative of a command for the digital apparatus to execute to interact with a host apparatus. The digital apparatus may include an information recognizing unit configured to recognize the command indicated by the information provided by the information providing units; and a control unit configured to transmit data or receive data based on the command. Thus, a user can input a user control signal to a digital apparatus in a user friendly manner.

7 Claims, 7 Drawing Sheets

USER INTERFACE APPARATUS, DIGITAL APPARATUS CONNECTED TO THE SAME, DATA TRANSMITTING SYSTEM INCLUDING THE USER INTERFACE, AND USER INTERFACE METHOD

CROSS-REFERENCE TO RELATED PATENT APPLICATION

This application claims the benefit of Korean Patent Application No. 10-2008-0085524, filed on Aug. 29, 2008, in the Korean Intellectual Property Office, the entire contents of which is incorporated herein by reference.

BACKGROUND OF THE INVENTION

1. Field of the Invention

The present invention relates to a user interface apparatus, a digital apparatus communicating with the same, a data transmitting system including the user interface, and a user interface method.

2. Description of the Related Art

Conventionally, when an image is captured and stored by using a digital camera, a user can view the captured image on a computer by separating a storage medium in which the image is stored from the digital camera, connecting the storage medium to a card reader, and finding a driver corresponding to the card reader in a file browser of the computer. Furthermore, the user can view the image by connecting a particular cable between the digital camera and the computer and finding a driver corresponding to the digital camera. Such tasks may not be difficult for a user who is familiar with using computers. However, the tasks may be troublesome and difficult for a user who is not familiar with using computers.

SUMMARY OF THE INVENTION

The present invention provides a user interface apparatus including a plurality of regions each of which provides information for controlling an operation of a digital apparatus.

A user interface apparatus is provided including a plurality of regions. The user interface apparatus may be configured to respond to a digital apparatus being disposed in a region, by sending information associated with the region. The information indicative of a command for the digital apparatus to execute to interact with a host apparatus.

The information is sent to the digital apparatus.

The user interface apparatus may be further configured to identify the region where the digital apparatus is disposed.

The plurality of regions may include a first region and a second region. The first region may include a first information providing unit sending first information to the digital apparatus. The first information may indicate a first command for the digital apparatus to execute. The second region may include a second information providing unit sending second information to the digital apparatus. The second information may indicate a second command for the digital apparatus to execute.

The user interface apparatus may include a storage unit configured to store a program for sending to the host apparatus for the host apparatus to recognize information from the user interface apparatus.

The user interface apparatus may include a data transmitting unit configured to transmit the program to the host apparatus.

The user interface apparatus may include a data transmitting unit configured to transmit data between the digital apparatus and the host apparatus.

A digital apparatus is provided including an information receiving unit. The digital apparatus may be configured to receive information from a user interface apparatus comprising a plurality of regions each of which comprises an information providing unit configured to provide information corresponding to the region. The digital apparatus may be configured to be disposed in a selected one of the plurality of regions. The digital apparatus may include a control unit configured to execute an operation based on a region the digital apparatus is disposed in.

The operation of the digital apparatus may include a first operation instructing the digital apparatus to transmit data to the host apparatus; and a second operation instructing the digital apparatus to receive data from the host apparatus.

The user interface apparatus may include a data transmitting unit, the data transmitting unit configured to transmit data to a host computer of the user interface apparatus.

A data transmitting system is provided for transmitting data from a digital apparatus to a host apparatus. The data transmitting system may include a user interface apparatus comprising a plurality of regions; and wherein the user interface apparatus is configured to respond to the digital apparatus being disposed in a region by sending information associated with the region. The information may indicate a command for the digital apparatus to execute to interact with the host apparatus. The digital apparatus may include an information recognizing unit configured to recognize the command indicated by the information provided by the information providing units; and a control unit configured to transmit data or receive data based on the command. A host apparatus may be configured to communicate with the digital apparatus.

The user interface apparatus may include a storage unit configured to store a program for sending to the host apparatus for the host apparatus to recognize information from the user interface apparatus.

The user interface apparatus may include a data transmitting unit configured to transmit the program to the host apparatus.

The control unit may include a first data transmitting unit configured to communicate with the host apparatus.

The first data transmitting unit may communicate with the host apparatus via the user interface apparatus.

The host apparatus may include a second data transmitting unit communicates for communicating with the digital apparatus.

The second data transmitting unit may communicate with the digital apparatus via the user interface apparatus.

A user interface method is provided. The user interface method includes in response to a digital apparatus being disposed in a region of a user interface apparatus having a plurality of regions, sending information associated with the region, the information indicating an operation for the digital apparatus to perform with a host apparatus.

Sending may include sending information associated with the region from a device disposed in the region. The information may indicate an operation for the digital apparatus to perform with a host apparatus.

The user interface method may include the digital apparatus performing the operation indicated by the information with the host apparatus.

The user interface method may include sending a program to the host apparatus for the host apparatus to recognize information from the user interface apparatus.

The user interface method may include in response to executing the operation, transmitting data between the digital apparatus and the host apparatus.

The data may be transmitted between the digital apparatus and the host apparatus via the user interface apparatus.

The data may be directly transmitted between the digital apparatus and the host apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Therefore there is a need in the art for a user interface apparatus including a plurality of regions. The user interface apparatus may be configured to respond to a digital apparatus being disposed in a region, by sending information associated with the region, the information indicative of a command for the digital apparatus to execute to interact with a host apparatus.

Figure 1:
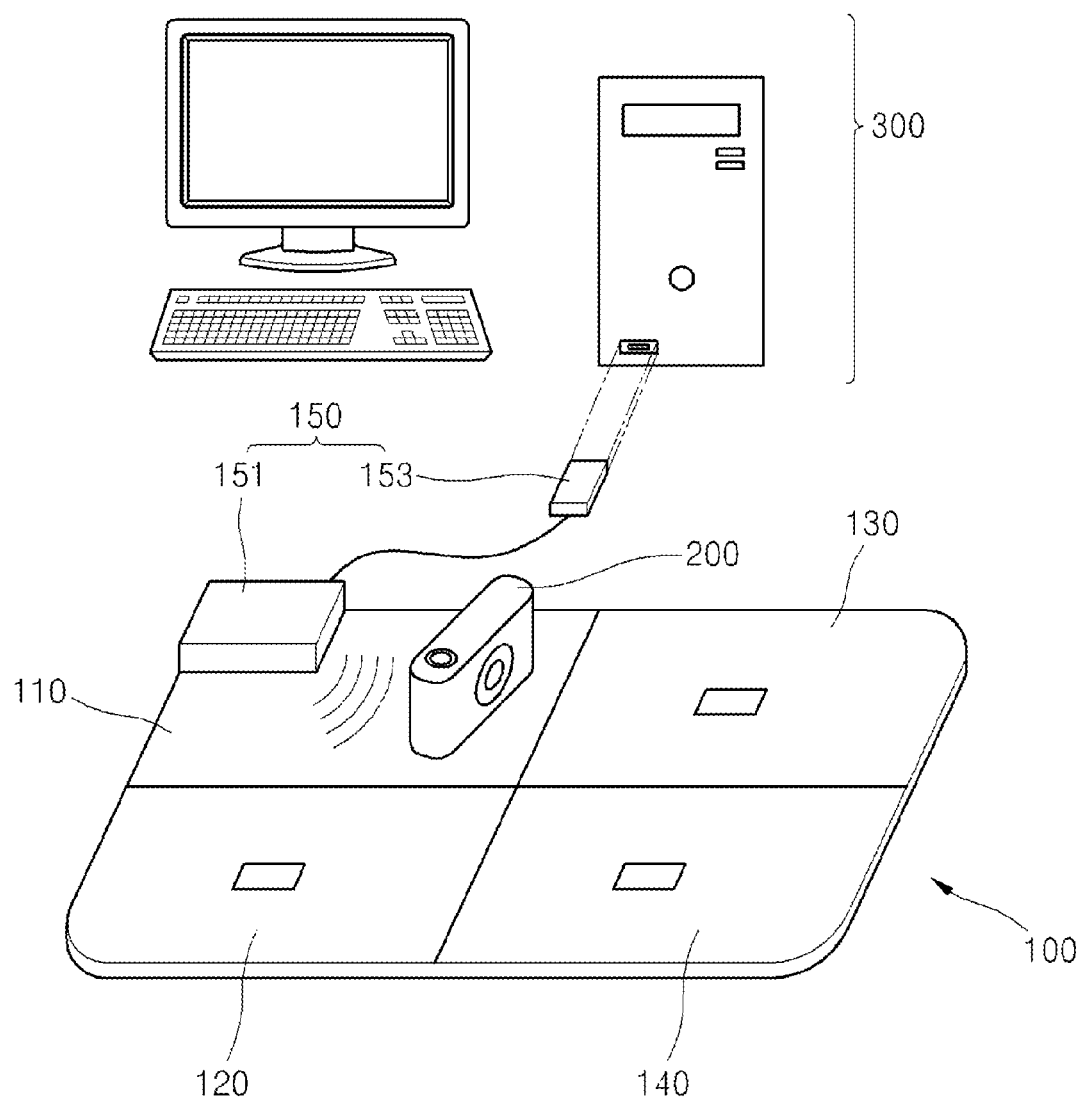
FIG. 1 is a diagram including an example of a user interface apparatus, an example of a digital apparatus, and an example of a host apparatus, according to an embodiment of the present invention.

FIG. 1 is a diagram including an example of a user interface apparatus 100, an example of a digital apparatus 200, and an example of a host apparatus 300, according to an embodiment of the present invention.

In the embodiment illustrated in FIG. 1, the user interface apparatus is a pad, the digital apparatus 200 is a digital camera, and the host apparatus 300 is a personal computer.

The user interface apparatus 100 includes a plurality of regions. In an embodiment, each of the regions includes an information providing unit 110, 120, 130, 140 which sends information which indicates a command for the digital apparatus 200 to execute.

For example, first region 110 may send first information which indicates a command for a digital camera 200 to download data from the host apparatus 300. The information may be stored in the first region 110. The second region 120 may send second information which indicates a command for the digital camera 200 to send data to the host apparatus 300. The third region 130 may send third information which indicates a command for a second digital apparatus, for example a MP3 player, to download data from the host apparatus 300. The fourth region 140 may send fourth information indicative of a command for the MP3 player to send data to the host apparatus 300. The information may be sent by an active or passive device disposed in the region or the user interface apparatus 100 may send the information from another location.

As illustrated in FIG. 1, when the digital apparatus 200 is disposed in the first region 110, the user interface apparatus 100 sends information associated with the first region 110 to the digital apparatus 200. The digital apparatus 200 receives the information and in response executes a command indicated by the sent information. For example, a user may place a digital camera 200 in the first region 110. The user interface apparatus 100 may send information associated with the first region 110 to the digital camera 200. The information may indicate that the digital camera 200 should execute a command to send pictures stored in the digital camera 200 to the personal computer 300.

The regions 110, 120, 130, 140 may be configured to indicate to a user the command for the digital apparatus 200 to execute. Some ways the command may be indicated include, but are not limited to, a different color for each region, icons representing the command for each region, pictographs representing the command for each region, and language indicating the command. Additionally, borderlines may be drawn on the user interface apparatus 100.

The user interface apparatus 100 may include a data transmitting unit 150. The data transmitting unit 150 may be configured to transmit data between the user interface apparatus 100 and the host apparatus 300, and/or between the user interface apparatus 100 and the digital apparatus 200. For example, the data transmitting unit 150 may transmit a program to the host apparatus 300. The program may be driver program and/or user interface program for the communicating with the user interface apparatus 100 and/or the digital apparatus 200. The program may enable the host apparatus 300 to recognize commands sent by the interface apparatus 100 and/or the digital apparatus 200.

Furthermore, the data transmitting unit 150 may transmit data between the digital apparatus 200 and the host apparatus 300. More particularly, the data transmitting unit 150 may receive data from the digital apparatus 200 and may transmit the received data to the host apparatus 300, and vice versa. The data transmitting unit 150 includes a first data transmitting unit 151 transmitting/receiving data to/from the digital apparatus 200, and includes a second data transmitting unit 153 transmitting/receiving data to/from the host apparatus 300.

In an embodiment, the user interface apparatus 100 may determine which region the digital apparatus 200 is disposed in and then the digital transmitting unit 150 may transmit the information associated with the region. The user interface apparatus 100 may determine the location of digital apparatus 200 by using a signal the digital apparatus 200 transmits.

The digital apparatus 200 may be able to transmit the data directly to the host apparatus 300 in which case the data transmitting unit 150 may not perform the data transmission.

The data transmitting unit 150 may transmit data with the digital apparatus 200 using a wired or wireless method. Methods of transmission may include using universal serial bus (USB) 2.0, and may also include wireless transmission methods such as Institute of Electrical and Electronics Engineers Standard (IEEE)1394, Wireless Fidelity (WI-FI), Blue-Tooth, etc. Furthermore, although the data transmitting unit 150 may transmit data with the host apparatus 300 using a wired or wireless method, a wireless method may be more preferable for user convenience. For example, the data transmitting unit 150 can transmit data with the host apparatus 300 via wireless methods such as WI-FI, wireless local area network (WLAN), wireless broadband (WIBRO), Blue-Tooth, etc.

According to the current embodiment of the present invention, the user interface apparatus 100 may be embodied in any shape as long as the user interface apparatus 100 includes a plurality of regions, and the digital apparatus 200 can receive information provided by the user interface apparatus 100 by being in communication with the user interface apparatus 100. In embodiments, the interface apparatus 100 includes information providing units for sending the information to the digital apparatus 200.

Embodiments of the digital apparatus 200 include, but are not limited by, a digital camera, MP3 player, a cellular phone, a personal digital assistant (PDA), and a portable media player (PMP). Embodiments of the host apparatus 300 include, but are not limited by, a home computer, a server, a special purpose device for service the digital apparatus 200, and a smart printer.

Figure 2:
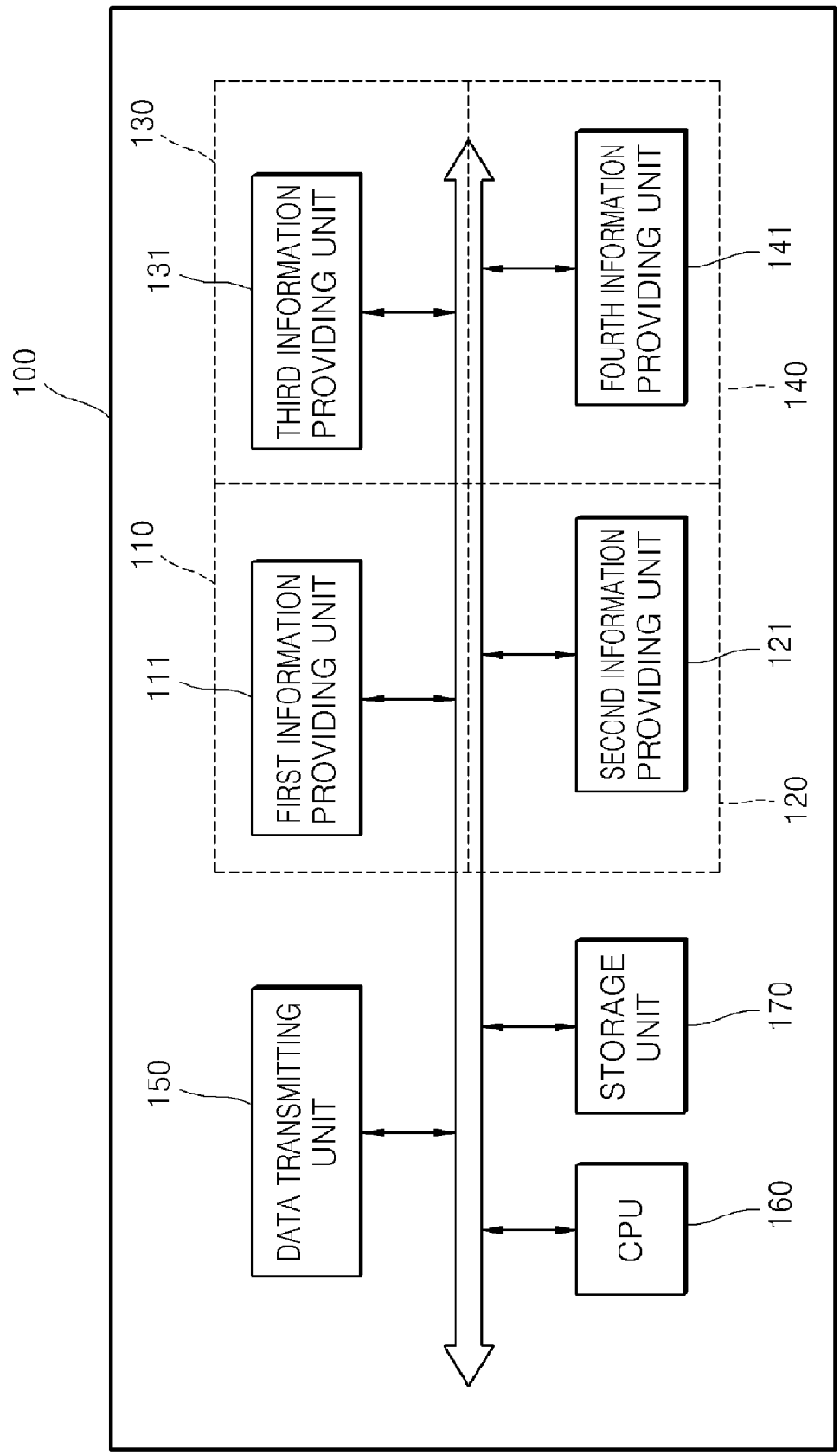
FIG. 2 is a block diagram of the user interface apparatus illustrated in FIG. 1, according to an embodiment of the present invention.

FIG. 2 is a block diagram of the user interface apparatus 100 illustrated in FIG. 1, according to an embodiment of the present invention.

Referring to FIG. 2, the user interface apparatus 100 according to the present embodiment includes of the first through fourth regions 110, 120, 130, and 140. Information for controlling operations of a digital apparatus are communicated in each of the first through fourth regions 110, 120, 130, and 140. More particularly, the first region 110 includes a first information providing unit 111 which provides first information for controlling a first digital apparatus to perform a first operation. The second region 120 includes a second information providing unit 121 which provides second information for controlling the first digital apparatus to perform a second operation. The third region 130 includes a third information providing unit 131 which provides third information for controlling a second digital apparatus to perform a third operation. The fourth region 140 includes a fourth information providing unit 141 which provides fourth information for controlling the second digital apparatus to perform a fourth operation. Furthermore, the first digital apparatus and the second digital apparatus may be the same and information for controlling four operations of the same digital apparatus may be sent to the digital apparatus based on which region the digital apparatus is disposed in.

When the digital apparatus 200 is disposed in one of the first through fourth regions 110, 120, 130, and 140, the digital apparatus 200 receives information indicating an operation to execute based on which region the digital apparatus 200 is disposed in. The digital apparatus 200 may be disposed in the user interface apparatus 100 by putting the digital apparatus 200 in physical contact with the region to initiate the information being sent to the digital apparatus 200. Alternatively, the digital apparatus 200 may determine which region the digital apparatus 200 is disposed in by determining which of the information providing units 110, 120, 130, 140 is sending the strongest signal. Alternatively, the user interface apparatus 100 may be able to identify which region the digital apparatus 200 is disposed in and based on the determination send information indicative of a command for the digital apparatus to execute. In an embodiment, the user interface apparatus 100 includes a camera that captures images of the digital apparatus. The images may be used by the user interface apparatus 100 to determine which region the digital apparatus 200 is disposed in. In an embodiment, the host computer may determine which region the digital apparatus 200 is disposed in.

Accordingly, an easy-to-use and straightforward user interface apparatus 100 for controlling operations of the digital apparatus 200 in synchronization with the host apparatus 300 is provided.

The user interface apparatus 100 may send to the host apparatus 300 (FIG. 1) a driver program and/or the user interface program for driving the user interface apparatus 100. The driver program and/or the user interface program may be installed on the host apparatus 100. Alternatively, a driver program and/or the user interface program may be provided on computer readable media and/or downloaded from an electronic communication network such as the Internet.

Furthermore, the user interface apparatus 100 may include a central processing unit (CPU) 160 for controlling operations of the user interface apparatus 100 and/or a storage unit 170 in which programs such as the driver program and/or the user interface program are stored.

Figure 3:
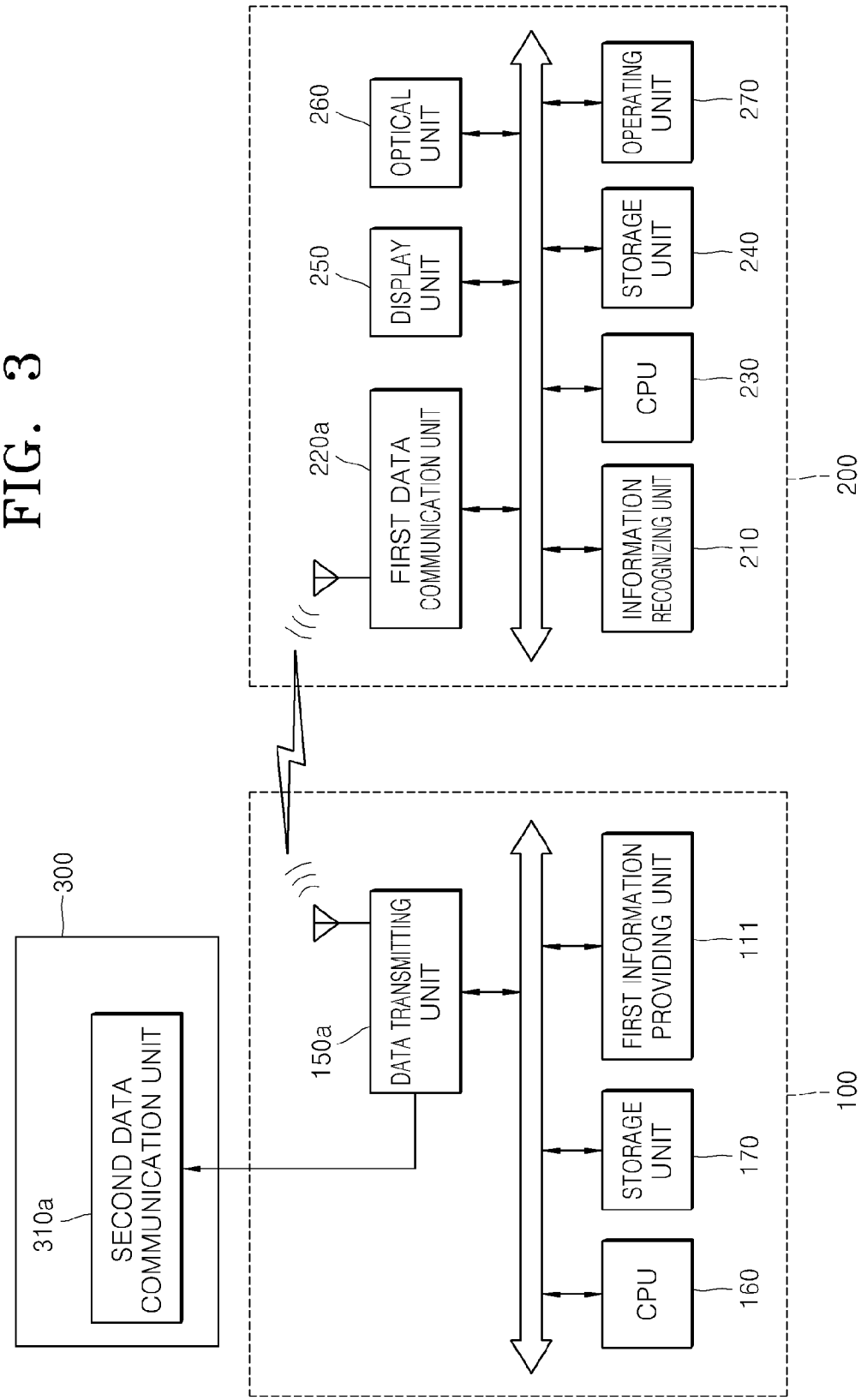
FIG. 3 is a block diagram of an example of a data transmitting system according to an embodiment of the present invention.

FIG. 3 is a block diagram of a data transmitting system according to an embodiment of the present invention. Referring to FIG. 3, the data transmitting system according to the present embodiment includes the digital apparatus 200, the user interface apparatus 200, and the host computer 100. As illustrated, the digital apparatus 200 is disposed in the first region 110 of the user interface apparatus 100. The user interface apparatus 100 sends to the digital apparatus 200 information indicative of an operation for the digital apparatus 200 to execute. In embodiments, the user interface apparatus 100 includes a first information providing unit 111.

In embodiments, the user interface apparatus 100 includes a data transmitting unit 150a for communicating with the host computer and/or the digital apparatus 200. For example, the user interface apparatus 100 may send programs such as a driver program and/or a user interface program for the host computer to communicate with the interface apparatus 100. As another example, the transmitting unit 150a may transmit information indicating which command the digital apparatus 200 should execute based on which region the digital apparatus 200 is disposed in. The user interface apparatus 100 may include a CPU 160 for controlling operations of the user interface apparatus 100, and a storage unit 170 for storing the programs and data.

In embodiments, the digital apparatus 200 connected to the user interface apparatus 100 includes an information recognizing unit 210. The information recognizing unit 210 reads out information from an information providing unit of the user interface apparatus 100. For example, if the information providing unit and the information recognizing unit 210 recognize information via radio frequency identification (RFID) communication, the information providing unit may be a RFID tag, and the information recognizing unit 210 may be a RFID reader. The RFID may be an active or passive RFID. In an embodiment, the information recognizing unit 210 may initiate communication with the information providing unit 111 for the information providing unit 111 to send the information associated with the region the digital apparatus is disposed in.

In embodiments, the digital apparatus 200 includes a first data communication unit 220a. In the current embodiment, data is transmitted between the digital apparatus 200 and the host apparatus 300 via the user interface apparatus 100. In this regard, the first data communication unit 220a transmits data with the data transmitting unit 150a of the user interface apparatus 100. For example, when the information recognizing unit 210 reads out first information for performing download of image files, the first data communication unit 220a downloads the image files from the host apparatus 300 via the data transmitting unit 150a. The current embodiment describes that the user interface apparatus 100 controls data transmitting operations of the digital apparatus 200 by showing data transmission as an example of an operation of the digital apparatus 200. Therefore, the first data communication unit 220a is shown as an example of a control unit for performing an operation corresponding to information read out by the information recognizing unit 210 of the digital apparatus 200. However, the digital apparatus 200 may include other components, other than the first data communication unit 220a, for controlling operations.

Some operations of the digital apparatus 200 may be controlled by a CPU 230. The digital apparatus 200 may include a storage unit 240 in which a program performing the operations, downloaded data, and data to be uploaded are stored. Furthermore, the digital apparatus 200 includes a display unit 250 displaying status of operation of the digital apparatus 200, downloaded data, and uploaded data. The display unit 250 may be a display panel such as a liquid crystal display (LCD), Electrophoresis display (EPD), organic light emitting display (OLED), or the like. If the digital apparatus 200 is an image capturing apparatus receiving and generating images, the digital apparatus 200 may include an optical unit 260. The optical unit 260 may include at least one lens such as a focusing lens or a zoom lens, an iris, a shutter, an imaging device, an analog-to-digital converter, etc. Furthermore, although not shown, the digital apparatus 200 may further include an image signal processing unit performing a predetermined process on image signals input by the optical unit 260. The digital apparatus 200 may include an operating console 270 by which a user can input control signals for operating the digital apparatus 200.

The host apparatus 300 is connected to the user interface apparatus 100. The host apparatus 300 includes a second data communication unit 310a. The second data communication unit 310a may receive data regarding programs such as a driver program and/or user interface program via the data transmitting unit 150a of the user interface apparatus 100. Furthermore, the second data communication unit 310a transmits data with the first data communication unit 220a via the data transmitting unit 150a.

A folder for separately managing data to be transmitted by the user interface apparatus 100 may be generated by installing the driver and/or the userware in the host apparatus 300. More particularly, when data to be transmitted to the digital apparatus 200 is moved to the folder and the digital apparatus 200 is disposed on the first region 110 of the user interface apparatus 100, the first data communication unit 220a of the digital apparatus 200 may receive the data stored in the folder via the second data communication unit 310a and the data transmitting unit 150a. Furthermore, if data is to be uploaded from the digital apparatus 200 to the host apparatus 300, the data stored in the digital apparatus 200 can be uploaded to the folder of the host apparatus 300 via the first data communication unit 220a, the data transmitting unit 150a, and the second data communication unit 310a. However, the present invention is not limited thereto, and generation of a folder and storage and management of data can be performed using various methods, according to a manufacturer and/or users of apparatuses. In the present invention, a user can input a control signal simply by turning on the digital apparatus 200 and disposing the digital apparatus 200 in one of the first through fourth regions 110 through 140 of the user interface apparatus 100, without the need for complicated operations.

Figure 4:
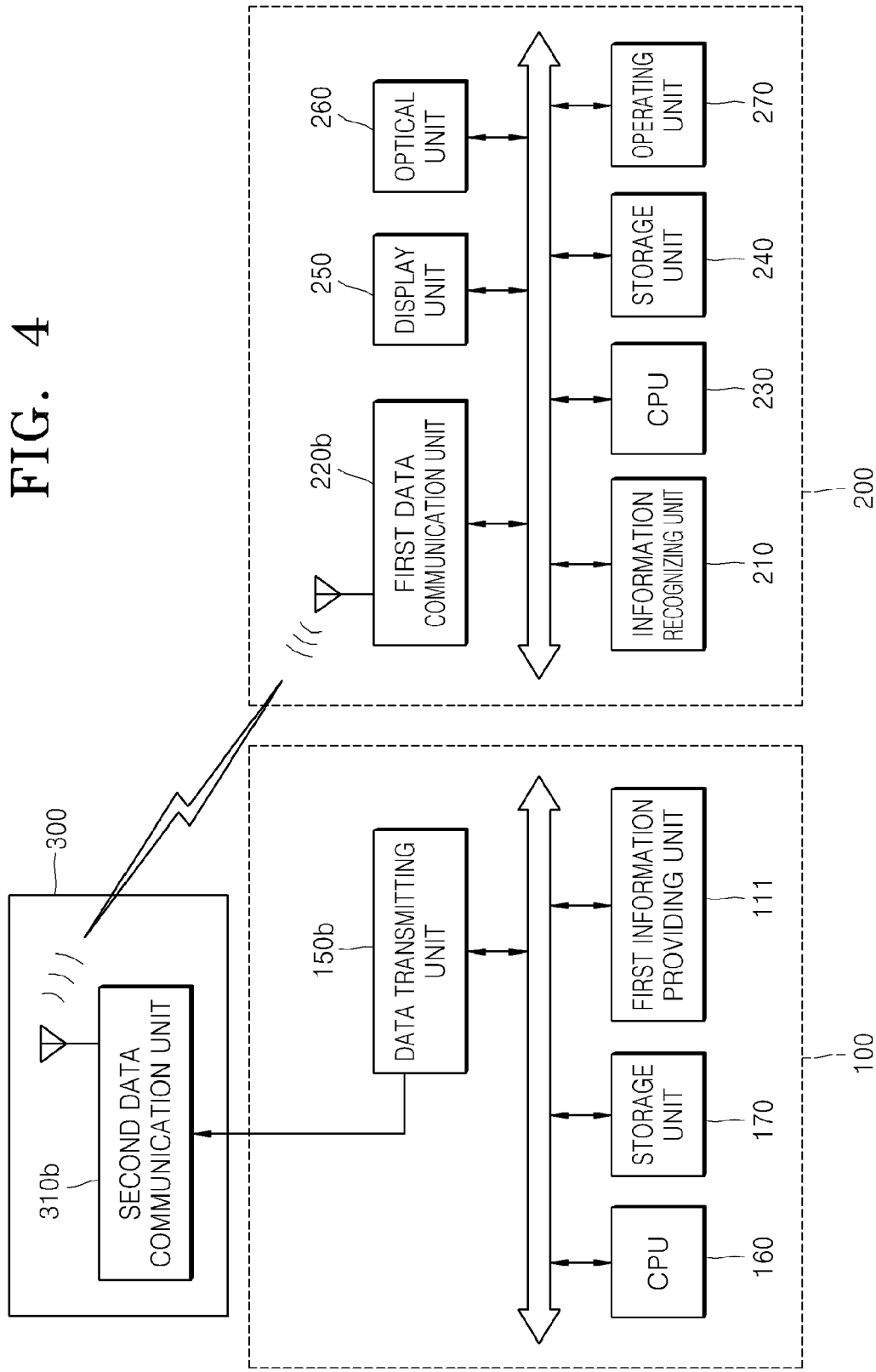
FIG. 4 is a block diagram of an example of a data transmitting system according to another embodiment of the present invention.

FIG. 4 is a block diagram of a data transmitting system according to another embodiment of the present invention. The current embodiment is similar to the embodiment of FIG. 3.

Referring to FIG. 4, a data transmitting unit 150b of the user interface apparatus 100 may communicate with a second data communication unit 310b of the host apparatus 300. The data transmitting unit 150b may transmit data regarding a driver program and/or user interface program for driving the user interface apparatus 100 to the second data communication unit 310b. Thus, the driver program and/or the user interface program can be installed in the host apparatus 300.

The information recognizing unit 210 of the digital apparatus 200 reads out first information provided by the first information providing unit 110 of the user interface apparatus 100. Then, the digital apparatus 200 executes an operation indicated by the first information. For example, the digital apparatus 200 may download data from the host apparatus 300. The data may be received by a first data communication unit 220b of the digital apparatus 200 from the second data communication unit 310b of the host apparatus 300. A particular folder may be generated by installing the driver program and/or the user interface program in the host apparatus 300 and the downloaded data may be stored therein. Then, when the digital apparatus 200 reads out the first information from the user interface apparatus 100, data stored in the folder may be downloaded according to the first information. At this point, the data can be directly downloaded via the second data communication unit 310b and the first data communication unit 220b. Furthermore, when the digital apparatus 200 reads out second information, data stored in the digital apparatus 200 may be transmitted to the host apparatus 300. At this point, data can be transmitted directly between the first data communication unit 220b and the second data communication unit 310b without requiring the data transmitting unit 150b of the user interface apparatus 100.

Figure 5:
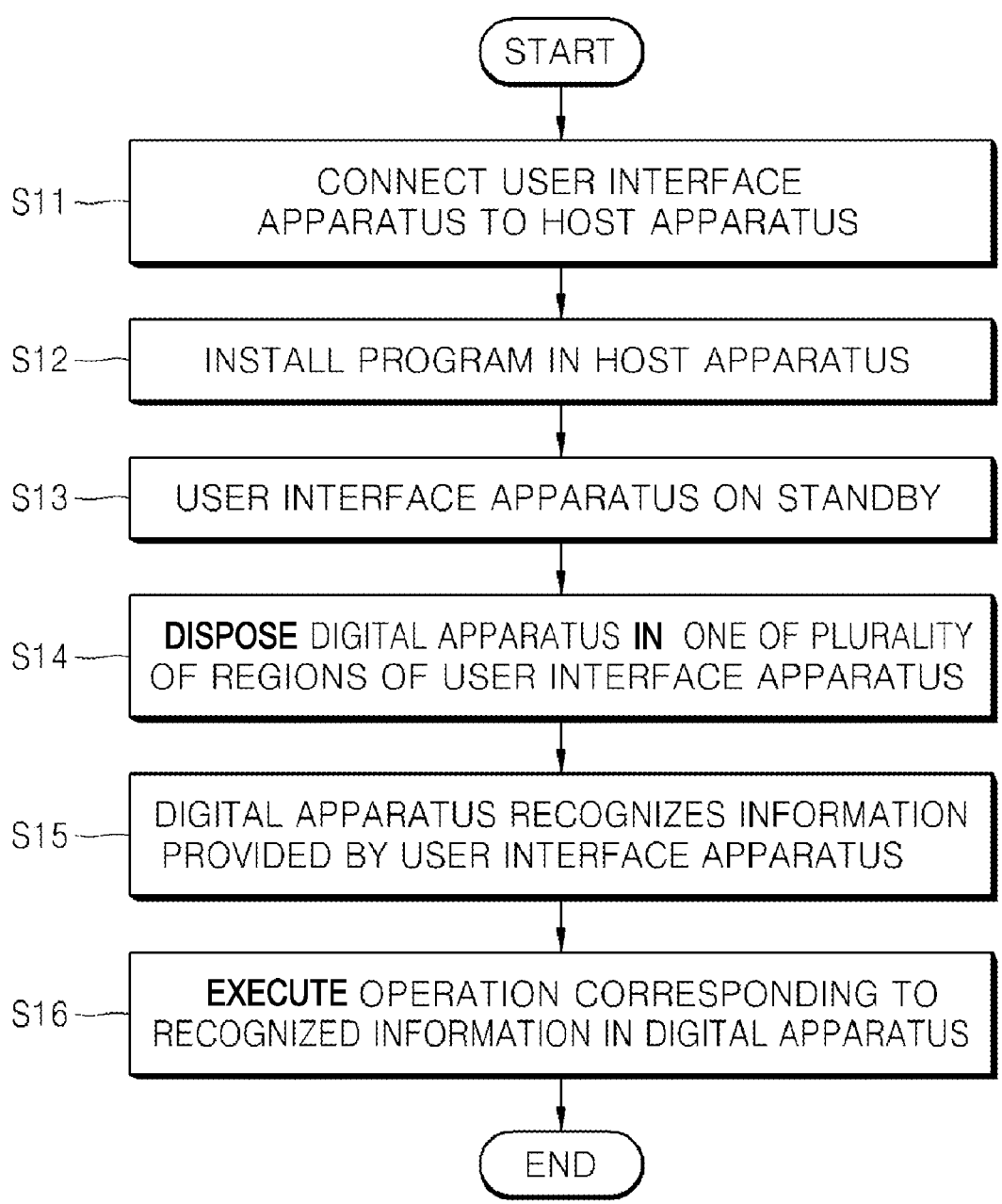
FIG. 5 is a flowchart of an example of a user interface method according to an embodiment of the present invention.

FIG. 5 is a flowchart of a user interface method according to an embodiment of the present invention.

Referring to FIG. 5, a user interface apparatus is connected to a host apparatus (operation S11). Then, a program for driving the user interface apparatus is installed in the host apparatus (operation S12).

The user interface is controlled to be on standby (operation S13).

Then, a digital apparatus is disposed in one of a plurality of regions of the user interface apparatus (operation S14). For example, the digital apparatus may be brought in contact with the user interface apparatus by being disposed on one of the plurality of regions of the user interface apparatus.

Next, information stored in and provided by the user interface apparatus is recognized by the digital apparatus (operation S15). Then, an operation corresponding to the information is execute (operation S16). For example, if information for controlling the digital apparatus to download data is stored in the region, the digital apparatus may read out the information and download data from the host apparatus according to the information.

Figure 6:
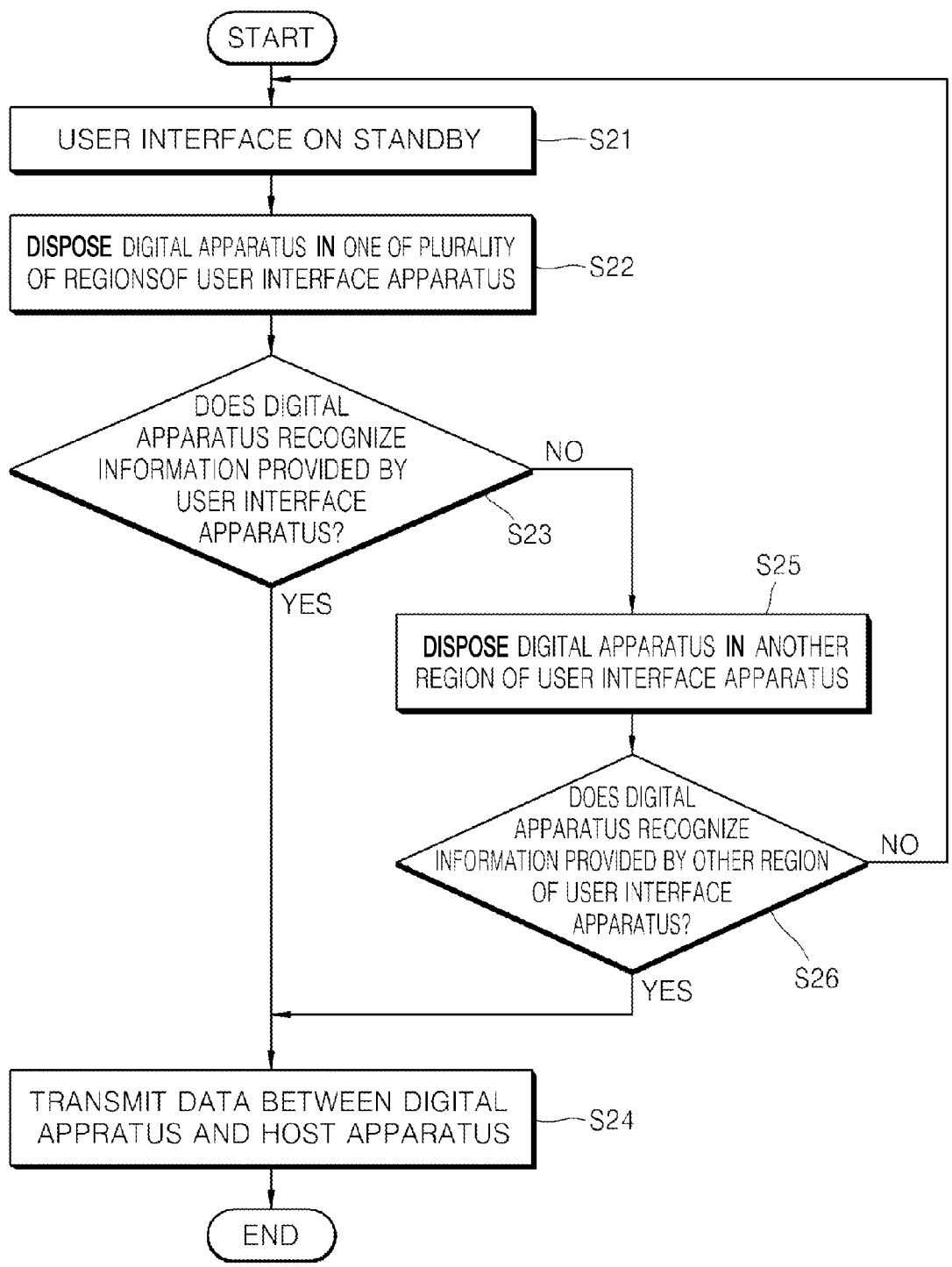
FIG. 6 is a flowchart of an example of a user interface method according to another embodiment of the present invention.

FIG. 6 is a flowchart of a user interface method according to another embodiment of the present invention. The user interface method according to the current embodiment is a method performed after a program for driving a user interface apparatus is installed in a host apparatus and the user interface apparatus is controlled to be on standby.

Referring to FIG. 6, a user interface is controlled to be on standby (operation S21).

Then, a digital apparatus is connected to one of a plurality of regions of the user interface apparatus (operation S22).

Next, it is determined whether the digital apparatus can recognize or not information provided by the region the digital apparatus is disposed in (operation S23).

If the digital apparatus recognizes information provided by the disposed in region, data is transmitted between the digital apparatus and a host apparatus (operation S24). If the digital apparatus fails to recognize the information, the digital apparatus is disposed in another region (operation S25). Then, it is determined whether the digital apparatus can recognize information provided by the other region or not (operation S26). If the digital apparatus recognizes the information, data is transmitted between the digital apparatus and the host apparatus. If the digital apparatus fails to recognize the information, the user interface apparatus may be controlled to be on standby again (the operation S21).

However, the present invention is not limited thereto, and information indicating failure of data recognition may be displayed if the digital apparatus fails to recognize information provided by the regions. For example, an alarm may be activated to inform a user of the failure, or the digital apparatus may include a display unit to display the information indicating failure.

Figure 7:
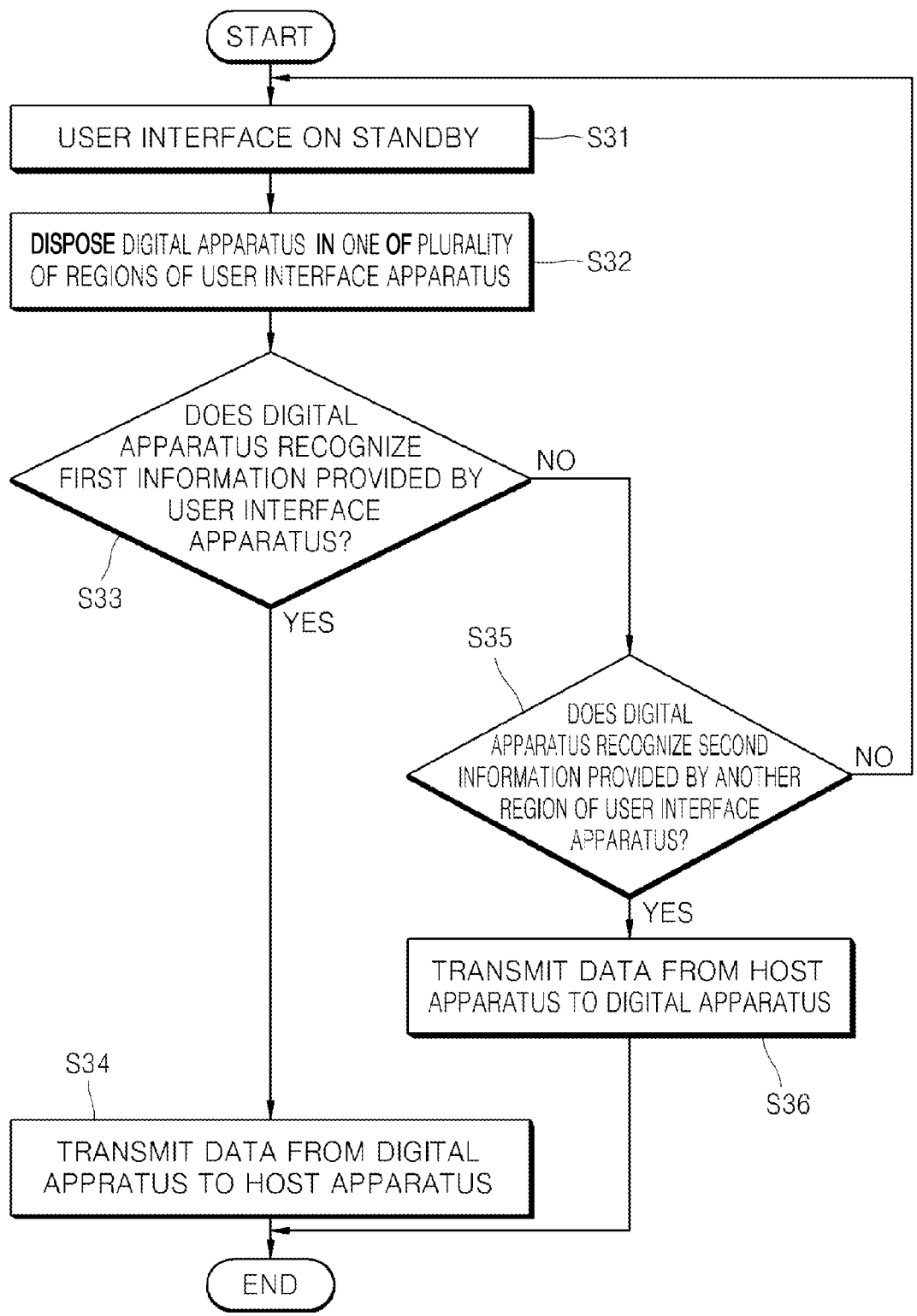
FIG. 7 is a flowchart of an example of a user interface method according to another embodiment of the present invention.

FIG. 7 is a flowchart of a user interface method according to another embodiment of the present invention. The user interface method according to the current embodiment is a method performed after a program for driving a user interface apparatus is installed in a host apparatus and the user interface apparatus is controlled to be on standby. Referring to FIG. 7, a user interface is controlled to be on standby (operation S31).

Then, a digital apparatus is disposed in one of a plurality of regions of the user interface apparatus (operation S32).

Next, it is determined whether the digital apparatus recognizes first information provided by the connected region or not (operation S33). If the digital apparatus recognizes the first information, data is transmitted from the digital apparatus to a host apparatus (operation S34). In other words, the digital apparatus may upload data to the host apparatus.

If it is determined that the digital apparatus does not recognize the first information, it is determined whether the digital apparatus recognizes second information provided by the same region or not (operation S35). If the digital apparatus recognizes the second information, data is transmitted from the host apparatus to the digital apparatus (operation S36). In other words, the digital apparatus may download data from the host apparatus. If the digital apparatus does not recognize even the second information, the user interface apparatus is controlled to be on standby again (operation S31).

However, the present invention is not limited thereto. For example, it may be determined whether the digital apparatus recognizes information other than the first information and the second information, and the digital apparatus may be controlled to perform an operation corresponding to information successfully recognized by the digital apparatus. Furthermore, the digital apparatus may activate an alarm to inform a user that the digital apparatus failed to recognize any information, or may display information indicating the failure.

Accordingly, according to the embodiments described above, inputting a user control signal or user command may be easy and straightforward.

The various illustrative units, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A user interface apparatus comprising:
a plurality of regions; and
a controller to identify in which of the plurality of regions a digital apparatus is placed, and to select information to send to the digital apparatus based on identified region, the information indicative of a command for the digital apparatus to execute to interact with a host apparatus, the selected information being different for each of the plurality of regions.

2. The user interface apparatus of claim 1, an information providing unit to send the selected information to the digital apparatus.

3. The user interface apparatus of claim 1, wherein the plurality of regions comprise a first region and a second region, wherein first information is selected for the first region, and second information is selected for the second region,
the first region comprising a first information providing unit to send the first information to the digital apparatus, the first information indicative of a first command for the digital apparatus to execute; and
the second region comprising a second information providing unit to send the second information to the digital apparatus, the second information indicative of a second command for the digital apparatus to execute.

4. The user interface apparatus of claim 1, wherein the plurality of regions further comprises a first region and a second region, wherein first information is selected for the first region, and second information is selected for the second region, the first region comprises a first information providing unit to provide the first information for controlling the digital apparatus to perform a first operation, and the second region comprises a second information providing unit to provide the second information for controlling the digital apparatus to perform a second operation.

5. The user interface apparatus of claim 1, further comprising a storage unit configured to store a program for sending to the host apparatus that, when executed, causes the host apparatus to at least recognize information from the user interface apparatus.

6. The user interface apparatus of claim 5, further comprising a data transmitting unit configured to transmit the program to the host apparatus.

7. The user interface apparatus of claim 1, further comprising a data transmitting unit configured to transmit data between the digital apparatus and the host apparatus.

* * * * *